United States Patent [19]

Suga

[11] Patent Number: 5,231,969
[45] Date of Patent: Aug. 3, 1993

[54] FUEL EVAPORATIVE EMISSION CONTROL SYSTEM FOR INTERNAL COMBUSTION ENGINE

[75] Inventor: Toshiyuki Suga, Wako, Japan

[73] Assignee: Honda Giken Kogyo Kabushiki Kaisha, Tokyo, Japan

[21] Appl. No.: 958,840

[22] Filed: Oct. 9, 1992

[30] Foreign Application Priority Data

Oct. 11, 1991 [JP] Japan .................. 3-292225

[51] Int. Cl.$^5$ ............................. F02M 25/08
[52] U.S. Cl. ................... 123/685; 123/698; 123/520; 123/1 A
[58] Field of Search .......... 123/698, 520, 1 A, 575, 123/685

[56] References Cited

U.S. PATENT DOCUMENTS 4,865,000  9/1989  Yajima ................ 123/520
4,945,885  8/1990  Gonze et al. ......... 123/520

FOREIGN PATENT DOCUMENTS 61-1857  1/1986  Japan ................ 123/520

Primary Examiner—Andrew M. Dolinar
Attorney, Agent, or Firm—Nikaido, Marmelstein, Murray & Oram

[57] ABSTRACT

A fuel evaporative emission control system for an internal combustion engine using a gasoline-alcohol blend fuel. The system includes a canister for trapping fuel vapors to purge them into an air intake passage of the engine through a pipe. A valve is provided at the pipe for closing/opening the same to control purging of fuel vapors to the air intake passage. In the system, when the fuel property is found to be changed from alcohol concentration detected, the valve is opened if correction coefficient for air-fuel ratio determined from an oxygen content sensor's output is within a predetermined upper and lower limit, while the valve is closed if the coefficient falls outside the range, whereby preventing degradation of the exhaust gas properties, misfiring and the like.

9 Claims, 2 Drawing Sheets

FUEL EVAPORATIVE EMISSION CONTROL SYSTEM FOR INTERNAL COMBUSTION ENGINE

BACKGROUND OF THE INVENTION

1. Field of the Invention

This invention relates to a fuel evaporative emission control system for an internal combustion engine, in particular for an engine which uses a hybrid fuel containing alcohol.

2. Description of the Prior Art

Conventional systems falling within the field of this invention include that taught by Japanese Laid-Open Patent Publication No. 58(1983)-119956, for example, which includes a canister for trapping fuel vapors to purge them into an air intake passage of the engine. In the earlier system, the alcohol concentration in the fuel is detected by an alcohol concentration sensor and the amount of purge air to the air intake passage is increased when the alcohol concentration is higher than a prescribed value and the fuel temperature is higher than a prescribed value, whereby the ratio of the fuel purged into the intake system to air is prevented from becoming too rich.

In the conventional system, when the alcohol concentration of the fuel in the fuel tank changes owing to a gasoline-alcohol blend or neat gasoline being freshly supplied to the fuel tank, the resulting difference in alcohol concentration between the fuel tank and the canister causes the air-fuel ratio of the air-fuel mixture to deviate greatly from the stoichiometric value, degrading the properties of the exhaust gas and, in the worst case, causing misfiring.

More specifically, in the case of a hybrid fuel consisting of a blend of alcohol and gasoline, when the fuel changes from a gasoline-alcohol blend such as M85 to neat gasoline, gasoline is supplied to the engine by the fuel injection valves while fuel vapors including alcohol are temporarily purged from the canister to the air intake passage. As the stoichiometric air-fuel ratio of gasoline is 14.7:1 while that of alcohol, e.g. methanol is 6.4:1, the stoichiometric air-fuel ratio of the engine changes in proportion to the amount of alcohol purged from the canister. It is also known that, inside the canister, gasoline vapors from the fuel tank are supplied into the alcohol vapors filling the interior of the canister, causing the pressure in the canister to increase owing to an azeotropic phenomenon between the alcohol and the gasoline, whereby the purge amount is more increased.

SUMMARY OF THE INVENTION

This invention was accomplished in the light of the aforesaid problems of the prior art systems and has as its object to provide a fuel evaporative emission control system for an internal combustion engine which responds to changes in the alcohol concentration of the fuel by optimally controlling the amount of fuel vapors (alcohol) purged from the canister into the engine intake system in accordance with the engine operating condition, thus preventing degradation of the exhaust gas properties, misfiring and other such adverse effects.

For realizing the object, the present invention provides a system for controlling fuel evaporative emission for an internal combustion engine using a gasoline-alcohol blend fuel and including a canister trapping fuel vapors to be purged into an air intake passage of the engine. The system comprises first means for detecting alcohol concentration in the fuel, second means for determining, in response to the detected alcohol concentration, if alcohol concentration in the fuel property changes, third means for detecting oxygen content in the exhaust gas of the engine, fourth means for determining an air-fuel ratio of the mixture in response to the detected oxygen content to discriminate if the determined air-fuel ratio is out of a predetermined limit, fifth means for purging the fuel vapors to the air intake passage of the engine and control means for inhibiting the purging if the determined air-fuel ratio is discriminated to be out of a predetermined limit when the fuel property change is determined.

BRIEF DESCRIPTION OF THE DRAWINGS

These and other objects and advantages of the invention will be more apparent from the following description and drawings, in which.

DETAILED DESCRIPTION OF THE PREFERRED EMBODIMENT

An embodiment of the invention will now be explained with reference to the attached drawings.

Figure 1:
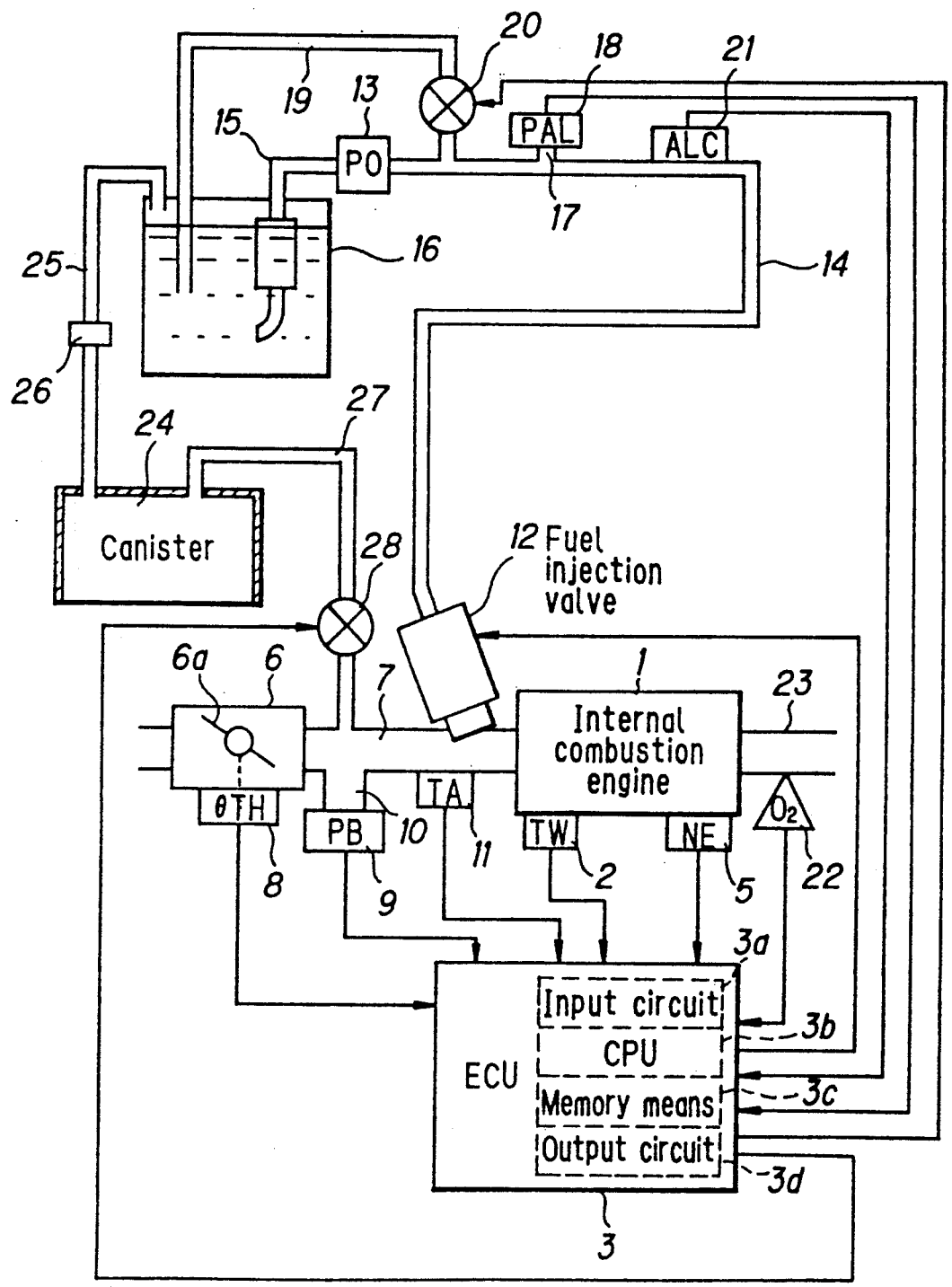
FIG. 1 is a schematic diagram showing a fuel evaporative emission control system for an internal combustion engine according to the invention.

Namely, as shown in FIG. 1, a coolant temperature sensor 2, shown as "TW" in the figure and made of a thermistor or the like is provided on the cylinder block of an engine 1, more specifically, is attached to the wall of a coolant-filled jacket enclosing the cylinders of the engine 1 using a gasoline-alcohol blend fuel. The coolant temperature sensor 2 sends an electric signal representing the engine coolant temperature TW detected thereby to an electronic control unit (ECU) 3.

An engine speed sensor 5, shown as "NE" in the figure, is installed in the vicinity of the engine cam shaft or crankshaft (neither shown) and produces a pulse signal (TDC pulse signal) once every 180 degrees of crankshaft rotation, at prescribed crank angle positions. The TDC pulse signals are also forwarded to the ECU 3. A throttle body 6 is provided in an air intake passage 7 of the engine 1. A throttle valve 6a provided in the throttle body 6 is linked with a throttle position sensor 8, shown as "θTH", which produces and sends to the ECU 3 an electric signal representing the opening θTH of the throttle valve 6a detected thereby. An air intake pressure sensor 9, shown as "PB", is provided in a branch pipe 10 branching from the air intake passage 7 at a position downstream of the throttle valve 6a. The PB sensor 9 produces and sends to the ECU 3 an electric signal representing the pressure PB at the air intake passage 7 detected thereby. And, an intake air temperature sensor 11, shown as "TA", is mounted on the wall of the air intake passage 7 at a point downstream of the branch pipe 10. The intake air temperature (TA) sensor 11 produces and sends to the ECU 3 an electric signal representing the intake air temperature TA detected thereby.

Each cylinder of the engine 1 is equipped with a fuel injection valve 12 that is located in the portion of the air intake passage 7 at a position between the engine 1 and the throttle valve 6a at a position upstream of the cylinder's intake valve (not shown). The fuel injection valves 12 are connected with a fuel pump 13 through a first fuel supply pipe 14. The open time (injection period) of the fuel injection valve 12 is regulated by a control signal from the ECU 3. A second fuel supply pipe 15 connects the fuel pump 14 with a fuel tank 16.

Reference numeral 17 designates another branch pipe branched from the first fuel supply pipe 14 at a point downstream of the fuel pump 13 and a fuel pressure sensor 18, shown as "PAL", is installed at its distal end to produces and sends to the ECU 3 an electric signal representing the fuel pressure detected thereby. Further branch pipe 19 is branched from the first fuel supply pipe 14 at a position between the fuel pump 13 and the branch pipe 17 to return fuel pumped by the fuel pump 13 to the fuel tank 16. To be more specific, the ECU 3 sends a control signal to a pressure regulator valve 20 in response to the output signal of the PAL sensor 18 and controls the opening degree of the pressure regulator valve 20 so as to regulate the pressure of fuel supplied from the fuel tank 16 to the fuel injection valve 12 at a predetermined pressure.

In addition, an alcohol concentration sensor 21, shown as "ALC", is installed in the inner wall of the first fuel supply pipe 14 at a point downstream of the branch pipe 17. The ALC sensor produces and sends to the ECU 3 an electric signal representing the alcohol concentration ALC detected thereby. And an $O_2$ sensor 22 is provided in an exhaust pipe 23 of the engine 1. The $O_2$ sensor 22 produces and sends to the ECU 3 an electric signal representing the oxygen content of the exhaust gas.

The system is further provided with a charcoal-filled canister 24 for accumulate fuel evaporation. The canister 24 is connected with the fuel tank 16 via a fuel vent pipe 25 and a check valve 26 for trapping fuel vapors to be absorbed with the charcoal charged in the canister 24 with filters (not shown). The fuel vapors are thus temporarily stored in the canister 24. At the top of the canister 24, a purge pipe 27 is provided to connect the canister 26 with the air intake passage 7 of the engine 1 for supplying fuel vapors to the passage 7 with an air, i.e. the purge air, drawn from the bottom of the canister 24. A purge control valve 28 is provided in the purge pipe 27, which, based on a control signal from the ECU 3, opens/closes the pipe 27 to control the purge amount of fuel vapors.

The ECU 3 has an input circuit 3a which functions to shape the wave forms of signals received from the sensors, adjust the signal voltages to a prescribed level, and convert the analog signals to digital signals. It also has a central processing unit (CPU) 3b, a memory means 3c comprising of a read-only memory (ROM) for storing certain tables and programs to be executed by the CPU 3b, a random access memory (RAM) for storing the results of computations and the like, and an output circuit 3d for outputting drive signals to the fuel injection valve 12, the pressure regulator valve 20 and the purge control valve 28.

Based on the engine parameters represented by the sensor output signals, the CPU 3b determines a fuel injection time Tout indicating the time for which each fuel injection valve 12 is to be maintained open.

Figure 2:
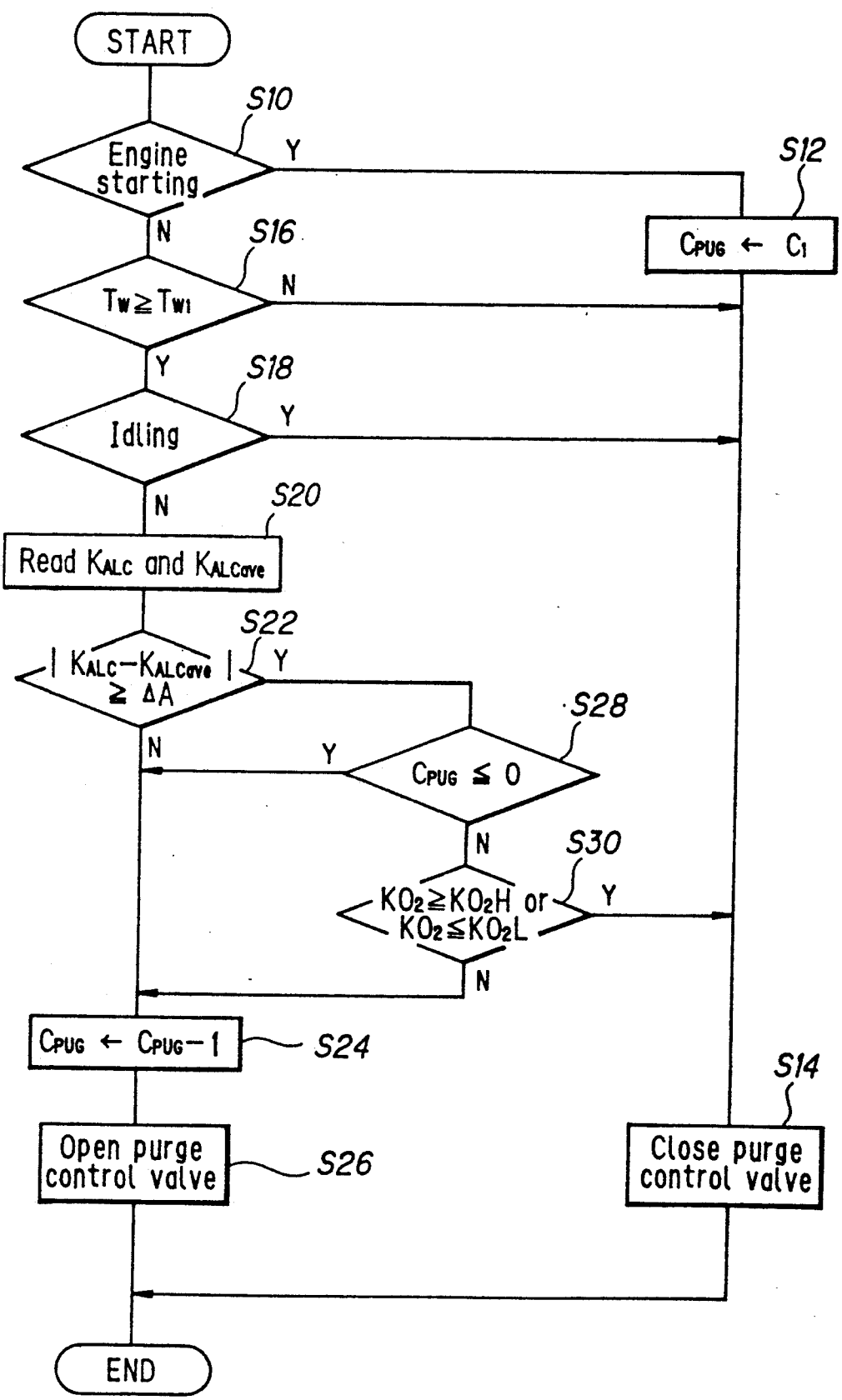
FIG. 2 is a flow chart showing the operation of the system shown in FIG. 1.

The operation of the system of the invention, more specifically control of the amount of fuel vapors purged from the canister 24 will now be explained with reference to a flow chart shown in FIG. 2. The program shown here is activated once every 40 ms.

The procedure begins with step S10 in which it is determined if the operating condition of the engine 1 is starting mode. This is made based on whether or not the starter switch (not shown) of the engine is on and whether or not the engine speed NE is at or below a prescribed starting speed (cranking speed). If the engine 1 is found to be starting, control then advances to step S12 in which a counter (timer) CPUG is set by a time value C1 corresponding to, for example, 30 seconds, and to step S14 in which the purge control valve 28 is closed. More specifically, the valve 28 is initially closed at the time of engine starting so that no action is made at this step.

If the judgment at step S10 is negative, control then passes to step S16 in which the detected engine coolant temperature TW is compared with a reference temperature TW1, 75° C., for example, to determine if the engine 1 has been warmed up. And if the temperature TW is found to be equal to or greater than the reference temperature TW1 indicating that the engine 1 is warmed up, control passes to step S18 in which it is determined if the engine 1 is idling. And if not, control moves to step S20 in which an alcohol correction coefficient KALC and an average value KALCave are read. The coefficient is used for correcting the fuel injection time Tout and is calculated in a subroutine flow chart, not shown, by retrieving by the detected value of the alcohol concentration ALC from a look-up table stored in the memory means 3c in advance. The average value KALCave is a value which was calculated by averaging the value KALC for predetermined cycles during the engine 1 was running, more specifically, during the time the engine 1 was about to stop. Thus, the value KALCave indicates alcohol concentration just before the engine 1 was restarted. The value KALCave was stored in a back-up ROM prepared at the aforesaid memory means 3.

Control next advances to step S22 in which the absolute value of the difference between the coefficient KALC currently obtained and the average value KALC thereof obtained before engine starting is compared with a prescribed value delta A to determine if the fuel property (ratio of alcohol to gasoline) has changed. The value delta A is therefore predetermined to be enough for the determination. And if the difference is found to be less than the value delta A, which means that the fuel property has not changed, control passes to step S24 in which the time value CPUG is decremented and to step S26 in which the purge control valve 28 is opened to start purging.

On the other hand, if the difference is found at step S22 to be equal to or exceed the prescribed value delta A, i.e., the fuel property is found to be changed, control passes to step S28 in which it is judged if the time value CPUG has reached to zero or less and if not, to step S30 in which an air-fuel ratio correction coefficient $KO_2$, commonly referred to as the $O_2$ feedback correction coefficient to be used in correcting the fuel injection time Tout, calculated from the output of the $O_2$ sensor 22 in a subroutine flow chart, not shown, is compared with a predetermined upper limit $KO_2H$ (e.g. 1.2) and a predetermined lower limit $KO_2L$ (e.g. 0.8) to determine if the air-fuel ratio correction coefficient $KO_2$ falls outside the range defined by the upper and lower limits.

If the air-fuel correction coefficient $KO_2$ is found to fall outside the range, since this means that the air-fuel ratio has changed greatly, control therefore advances to step S14 in which the purge control valve 28 is closed. Since refueling will only take place when the engine is stopped, the judgment at step S30 is therefore limited to the period CPUG (30 sec.) which is set to be sufficient for completely purging fuel vapors trapped in the canister. On the other hand, if the air-fuel ratio correction coefficient $KO_2$ is found to be within the range $(0.8 \leq KO_2 \leq 1.2)$, since this means that the air-fuel ratio has not changed greatly, control passes, via step S24, to step S26 and the valve is kept opened.

With the arrangement, the changes in the fuel property can be detected accurately so that the purge control can be carried out optimally. As a result, degradation of the exhaust gas properties, misfiring and the like can be reliably prevented.

In the above, although the difference is calculated between the single value obtained after engine starting and the average value thereof obtained before engine starting, it may alternatively be possible to calculate an average value thereof after engine starting and calculate the difference for comparison between the average value and a single value obtained before engine starting, or it may further be possible to use both single values before and after engine starting for comparison, or to use both average values for the same purpose.

The present invention has thus been shown and described with reference to the specific embodiment. However, it should be noted that the present invention is in no way limited to the details of the described arrangements, but changes and modifications may be made without departing from the scope of the appended claims.

What is claimed is:

1. A system for controlling fuel evaporative emission for an internal combustion engine using a gasoline-alcohol blend fuel and including a canister trapping fuel vapors to be purged into an air intake passage of the engine, comprising:
   first means for detecting alcohol concentration in the fuel;
   second means for determining, in response to the detected alcohol concentration, if alcohol concentration in the fuel property changes;
   third means for detecting oxygen content in the exhaust gas of the engine;
   fourth means for determining an air-fuel ratio of the mixture in response to the detected oxygen content to discriminate if the determined air-fuel ratio is out of a predetermined limit;
   fifth means for purging the fuel vapors to the air intake passage of the engine; and
   control means for inhibiting the purging if the determined air-fuel ratio is discriminated to be out of a predetermined limit when the fuel property change is determined.

2. A system according to claim 1, wherein said control means inhibits the purging if the determined air-fuel ratio is discriminated to be out of a predetermined upper or lower limit.

3. A system according to claim 1, wherein said fourth means obtains an air-fuel ratio correction coefficient in response to the detected oxygen content and carries out the discrimination by comparing the air-fuel ratio correction coefficient with a predetermined limit.

4. A system according to claim 1, wherein said second means carries out the determination based on the change in the alcohol concentration detected before and after engine starting.

5. A system according to claim 4, wherein said second means calculates a difference between the alcohol concentration detected before engine starting and that detected after engine starting, compares the difference with a reference value, and if the difference exceeds the reference value, determines that the fuel property changes.

6. A system according to claim 5, wherein the alcohol concentration detected before engine starting is averaged for a predetermined period.

7. A system according to claim 1, wherein said second means determines an alcohol correction coefficient for correcting fuel injection in response to the detected alcohol concentration to calculate a difference between the alcohol correction coefficient determined before engine starting and that determined after engine starting, compares the difference with a reference value, and if the difference exceeds the reference value, determines that the fuel property changes.

8. A system according to claim 7, wherein the alcohol correction coefficient determined before engine starting is averaged for a predetermined period.

9. A system according to claim 1, wherein said fourth means carries out the discrimination for a predetermined period after engine starting.

* * * * *